United States Patent [19]
Ishizaki et al.

[11] Patent Number: 4,668,003
[45] Date of Patent: May 26, 1987

[54] VEHICLE BODY WITH ASYMMETRIC LOCATION OF FRONT DRIVER AND PASSENGER SEATS

[75] Inventors: Hiroshi Ishizaki; Hiroki Hayashi, both of Saitama, Japan

[73] Assignee: Honda Giken Kogyo Kabushiki Kaisha, Tokyo, Japan

[21] Appl. No.: 837,714

[22] Filed: Mar. 10, 1986

[30] Foreign Application Priority Data

Apr. 16, 1985 [JP] Japan .................... 60-081153

[51] Int. Cl.$^4$ ............................. B60N 1/00
[52] U.S. Cl. .................... 296/63; 180/89.1; 180/315
[58] Field of Search .............. 296/185, 63, 64, 65 R; 180/89.1, 315

[56] References Cited

U.S. PATENT DOCUMENTS

| | | |
|---|---|---|
| 3,352,597 | 11/1967 | Barenyi ................... 296/185 |
| 4,231,607 | 11/1980 | Bohlin ..................... 296/63 |
| 4,489,972 | 12/1984 | Monzini ................... 296/185 |

FOREIGN PATENT DOCUMENTS 662887  8/1965  Belgium ................. 296/185

*Primary Examiner*—Robert R. Song
*Attorney, Agent, or Firm*—Lyon & Lyon

[57] ABSTRACT

The body of a vehicle has a floor and two sides, with a body longitudinal center line being defined midway between these two sides. A driver's seat is fixed to the floor on one side of this body longitudinal center line, and a front passenger's seat is fixed to the floor on the other side thereof. The approximate center of the driver's seat lies substantially closer to this body longitudinal center line than does the approximate center of the front passenger's seat. Thereby, more room is obtained for the driver, at the expense of somewhat diminishing the room available for the front passenger. Further, it becomes possible for the driver's seat directly to oppose the control pedals, without any slanting sitting attitude being required from the driver. Optionally, a hand brake lever and/or a transmission shift lever may be fitted approximately on the central line between the driver's seat and the front passenger seat, and further optionally the central point between the inner ends of the sun visors for the driver and the front passenger may also lie approximately on the seat center line, at which seat center line further, optionally, the rear view mirror may be positioned. Thereby, the essential asymmetry of this passenger compartment arrangement may be effectively concealed from the beholder.

20 Claims, 3 Drawing Figures

VEHICLE BODY WITH ASYMMETRIC LOCATION OF FRONT DRIVER AND PASSENGER SEATS

BACKGROUND OF THE INVENTION

The present invention relates to a vehicle body, and more specifically relates to a vehicle body in which the front driver's seat and the front passenger's seat are asymmetrically disposed with respect to the central line of the vehicle body.

In the following explanations, it will be assumed that the vehicle in question is of the so called right hand drive configuration, in which the driver sits on the right side thereof and a front passenger optionally sits on the left side thereof; but this should not be considered as limitative, but as applying equally to a left hand drive configuration type vehicle, mutatis mutandis.

In the prior art, generally a vehicle body has been built in a symmetrical fashion with respect to its central line, i.e. with respect to the line drawn as connecting the middle points of the front and the rear axle lines of the vehicle. In the vehicle interior, except for the arrangements relating to the instrument panel and dash board, the control pedals and hand controls, the interior arrangements of the vehicle body have been conventionally symmetrical about the center line, and in particular, in the case of a vehicle with so called bucket seats in which the driver's seat and the front passenger's seat are separately provided, the two front seats have been symmetrically positioned: in other words, the driver's seat and the front passenger's seat are located at equal distances on opposite sides of the vehicle center line. Thus, in the conventional art, the spaces allocated to the driver and to the front seat passenger have been substantially identical in form and size, being mirror images of one another.

The problems with such a conventional layout, however, have been manifold. Since, particularly in the case of a small car, the interior dimensions are necessarily limited, the driver may be cramped due to the presence of a passenger in the front passenger's seat. Furthermore, the left arm or shoulder of the driver may interfere with the passenger, or alternatively the right arm or shoulder of the driver may interfere with the interior accoutrements of the vehicle passenger compartment. Since a vehicle is often operated by a driver without any passenger sitting in the front passenger's seat, the space allocated to such a passenger sitting in the front passenger's seat is often wasted.

Also, typically there is a fairly substantial bulge on the right side of the foot space allocated to the driver, due to the intrusion of the right side front wheel housing thereinto, and this often makes it necessary for the control pedals (the brake and accelerator pedals and an optional clutch pedal) to be offset to the left from the central line of the driver's seat, i.e. towards the central line of the vehicle body, from their most natural and ergonomic position. This can cause the driver to be necessarily seated in a cramped and unnatural position, somewhat slanted from the longitudinal line of the vehicle body, which is clearly undesirable since in such a case the driver is prevented from looking straight ahead and is forced to look sideways.

SUMMARY OF THE INVENTION

The present invention is based upon the recognition that, since a passenger in the front seat is much less active than the driver, such a passenger is less prone to becoming cramped than the driver. Further, cramping of such a passenger is intrinsically less important than cramping of the driver, because the comfort of the driver is in any case more important than that of the passenger since the driver bears the responsibility of controlling the vehicle and also typically is the owner of the vehicle. Thus, the present inventive entity has come to question the conventional wisdom of allocating similar spaces to the driver and to the front seat passenger.

Accordingly, it is the primary object of the present invention to provide a vehicle body in which the passenger compartment arrangement is such as to maximize effectiveness of space utilization.

It is a further object of the present invention to provide such a vehicle body, in which comfort of the driver is maximized.

It is a further object of the present invention to provide such a vehicle body, in which interference between any part of the driver's body and the vehicle body is minimized.

It is a yet further object of the present invention to provide such a vehicle body, in which the driver is enabled to sit squarely opposite the control pedals without any slanting relative to the longitudinal direction of the vehicle.

It is a yet further object of the present invention to provide such a vehicle body, in which essential asymmetry of the interior arrangements thereof is concealed as much as practicable from the eye of the beholder.

According to the present invention, these and other objects are accomplished by a vehicle body comprising: a driver's seat fixed to the floor on one side of the body longitudinal center line; and (b) a front passenger's seat fixed to the floor on the other side of the longitudinal body center line; (c) the approximate center of the driver's seat lying substantially closer to the longitudinal center line of the vehicle body, than does the approximate center of the front passenger's seat.

According to such a structure, comfort of the driver is maximized, and accordingly cramping of the driver is effectively minimized, because the sitting space allocated to the driver is preferentially increased at the expense of the space allocated to the passenger. Thus, the passenger compartment arrangement is such as to maximize effectiveness of space utilization. Further, according to the construction specified above, there is provided a vehicle body in which the driver is enabled to sit squarely opposite the control pedals without any slanting relative to the longitudinal direction of the vehicle, which is very beneficial from the point of view of good control.

Further, according to particular specializations of the present invention, a central floor tunnel may be formed along the longitudinal center line of the vehicle body: and in this case a hand brake lever, a transmission shift lever and so on may be fitted in a position laterally offset from the center of the floor tunnel towards the front passenger's seat.

Alternatively, a floor tunnel may be formed offset from the longitudinal center line of the vehicle body towards the front passenger's seat. In this case, a hand brake lever, a transmission shift lever and so on may be fitted at laterally central position on the floor tunnel.

According to another aspect of the present invention, a driver's side sun visor is wider than a passenger's side sun visor and the mid point between their inner ends is offset towards the front passenger's seat from the longitudinal center line of the vehicle body; and a rear view mirror may be fitted to a mid point between the inner ends of the sun visors.

With some or all of these various arrangements, the effect is obtained of concealing as much as possible the essential asymmetry of the interior arrangements of the vehicle from the eye of the beholder.

BRIEF DESCRIPTION OF THE DRAWINGS

The present invention will now be shown and described in the following in terms of concrete embodiments thereof with reference to the appended drawings, in which.

DESCRIPTION OF THE PREFERRED EMBODIMENTS

Figure 1:
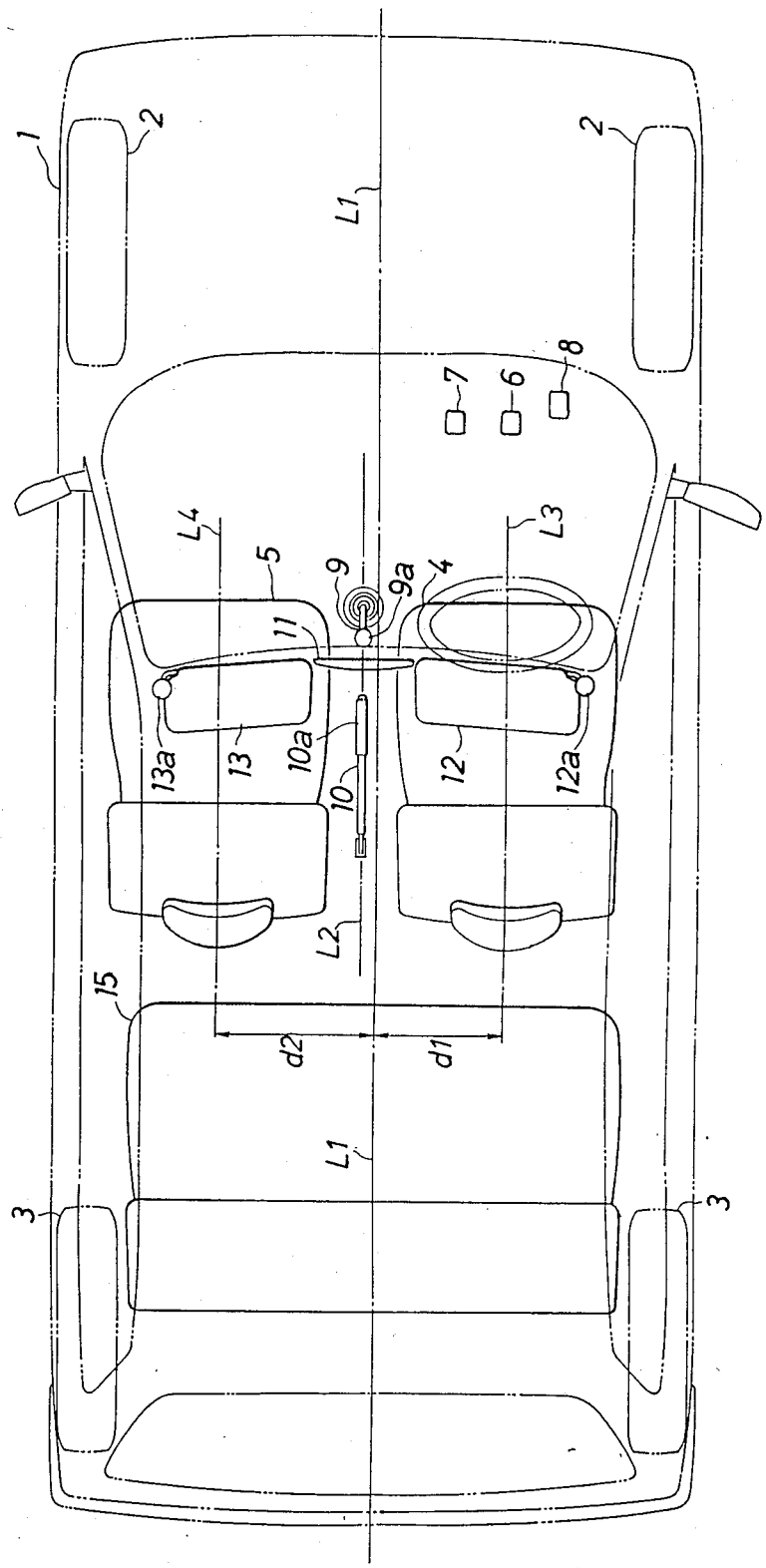
FIG. 1 is a schematic plan view showing the first preferred embodiment of the vehicle body of the present invention.
Figure 2:
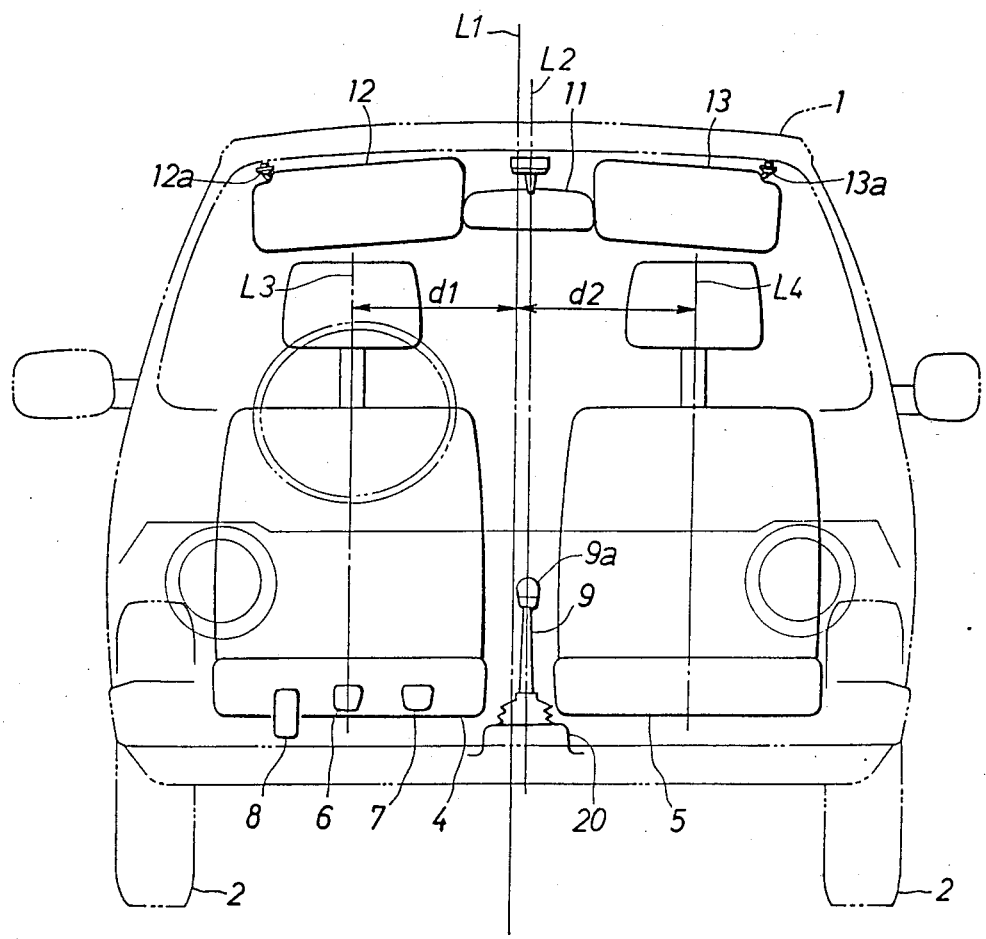
FIG. 2 is a schematic front view of the first preferred embodiment.

FIG. 1 shows the first preferred embodiment of the vehicle body of the present invention in schematic plan view, while FIG. 2 shows the vehicle body in schematic view as seen from the front thereof. Rotatably attached to this vehicle body 1, which is a body for a right hand drive configuration type vehicle, there are, denoted by the reference numerals 2 and 3 respectively, the front wheels and the rear wheels of the vehicle. The center line of the body 1, about which the body 1 is symmetrical, is shown in the figures by the line L1, and the front wheels 2 and the rear wheels 3 are similarly symmetrically disposed on either side of this center line L1 at equal distances therefrom. Thus, the center line L1 connects the middle points of the front and the rear axle lines (not particularly shown) of the vehicle body. The body 1 may, for example, be made by press forming steel plate in a so called monocoque structure.

The front seats of the vehicle are denoted as 4 and 5: the seat 4 is a seat for the vehicle driver, and is on the right side of the vehicle body, while the seat 5 is a seat for a passenger and is on the left side of the vehicle body. These seats 4 and 5 are, in the first preferred embodiment, of the same dimensions and configuration but are mirror images of one another, and are attached to the floor of the vehicle body 1 on either side of the center line L1. The distance between the center line L3 of the driver's seat 4 and the center line L1 of the vehicle body 1 to which the center line L3 is parallel, denoted as d1, is substantially less, than the distance between the center line L4 of the passenger's seat 5 and the center line L1 of the vehicle body 1 to which the center line L4 is similarly parallel, denoted as d2; in other words, the center line L2 defined between the driver's seat 4 and the passenger's seat 5 (which is equidistant between the parallel center lines L3 and L4 of the seats and is parallel thereto) is offset by a substantial distance (in fact approximately equal to half of the difference between d2 and d1) from the center line L1 of the vehicle body, while extending parallel thereto.

Squarely in front of the driver's seat 4, approximately on the center line L3 thereof, there is positioned a brake pedal 6, and a clutch pedal 7 (since this exemplary vehicle is a manual transmission type vehicle) is provided on the left of the brake pedal 6 while an accelerator pedal 8 is provided on the right of the brake pedal 6, in a per se conventional arrangement. The distance between the clutch pedal 7 and the brake pedal 6 is approximately equal to the distance between the accelerator pedal 8 and the brake pedal 6.

A floor tunnel 20 is formed on the floor of the vehicle body 1 extending in the longitudinal direction thereof, with the center line L2 between the driver's seat 4 and the passenger's seat 5 passing along the center of the floor tunnel 20; and a shift lever 9 projects upward from an intermediate point along the tunnel 20. Of course, this shift lever 9 is connected via rods and levers or the like to control the transmission of the vehicle, although these arrangements are not particularly shown. Thus, the knob 9a of this shift lever 9 is substantially equidistant between the driver's seat 4 and the passenger's seat 5. Further, a hand brake lever 10 projects upward from another intermediate point along the tunnel 20, to the rear of the shift lever 9, and similarly this hand brake lever 10 is connected via a cable or the like to control the parking brake system of the vehicle, although these arrangements are not particularly shown either. Thus, the grip portion 10a of this parking brake lever 10 is similarly substantially equidistant between the driver's seat 4 and the passenger's seat 5. In other words, the shift lever 9 and the hand brake lever 10 are set to be symmetrical about the center line L2 between the driver's seat 4 and the passenger's seat 5, not about the center line L1 of the vehicle body 1.

A rear view mirror 11, which is substantially symmetric in shape, is mounted to a point on the ceiling of the vehicle body 1 generally along the top edge of the front windscreen opening thereof and laterally located substantially on the center line L2 between the driver's seat 4 and the passenger's seat 5. A driver's side sun visor 12 is pivoted by a pivot arrangement 12a of a per se known sort to a point on the ceiling of the vehicle body 1 generally at the top right corner of the front windscreen opening thereof, so as to be selectively turnable downwards so as to shield the eyes of a driver 4 from glare coming from the upper front and the upper side directions; and, similarly, a passenger's side sun visor 13 is pivoted by a pivot arrangement 13a also of a per se known sort to a point on the ceiling of the vehicle body 1 generally at the top left corner of the front windscreen opening thereof.

In this first preferred embodiment of the present invention, the distance between the pivot arrangement 12a for the driver's side sun visor 12 and the center line L1 of the vehicle body 1 is set to be substantially equal to the distance between the pivot arrangement 13a for the passenger's side sun visor 13 and the center line L1 of the vehicle body 1; in other words, the pivot points of the sun visors 12 and 13 are set to be symmetrical about the center line L1 of the vehicle body 1, not about the center line L2 between the driver's seat 4 and the passenger's seat 5. And, the driver's side sun visor 12 is substantially longer than the passenger's side sun visor 13 so that the inner end of the driver's side sun visor 12 is located at approximately the same distance from the center line L2 between the driver's seat 4 and the passenger's seat 5 as is the inner end of the passenger's side sun visor 13; in other words, the inner ends of the sun visors 12 and 13 are set to be symmetrical about the center line L2 between the driver's seat 4 and the passenger's seat 5, not about the center line L1 of the vehicle body 1.

It has been found that this arrangement is the best in view of the desirability of concealing the asymmetrical arrangement of the passenger compartment as a whole. In the shown first preferred embodiment, the driver's side sun visor 12 and the passenger's side sun visor 13 are constructed to have substantially the same vertical dimensions.

Finally, the rear seat 15 of the vehicle is constructed as a so called bench seat in which the right side and the left side seats are integrally formed in a symmetric manner, and this rear seat 15 is so mounted in the passenger compartment that it is symmetrically located about the center line L1 of the vehicle body 1, not about the center line L2 between the driver's seat 4 and the passenger's seat 5.

According to the construction shown, by thus offsetting the center line L2 between the driver's seat 4 and the passenger's seat 5 towards the passenger's seat 5 away from the center line L1 of the vehicle body 1, there is provided a vehicle body in which the passenger compartment arrangement is such as to maximize effectiveness of space utilization and is such as to maximize driver comfort. This is because more space is allocated for the driver, who is required to be active and to control the vehicle, than is allocated for the passenger, whose role is an essentially passive one. At the same time, because the interior arrangements of the passenger compartment are arranged as explained above, the essential asymmetry of the passenger compartment is concealed as much as practicable from the eye of the beholder.

And, as a particular further beneficial consequence of this construction, the driver is enabled to sit squarely opposite the control pedals without any slanting relative to the longitudinal direction of the vehicle, and accordingly can look straight ahead in the direction of the vehicle's travel without being forced to look sideways. According to this, it has become possible to align the central line L3 of the driver's seat 4 substantially parallel to the longitudinal axis L1 of the vehicle body. Although this is not to be considered as essential to the present invention, it is a useful and desirable specialization thereof.

In the above shown first preferred embodiment of the present invention, the driver's seat 4 was made similar but enantiomorphic to the front passenger's seat 5, and in particular was made of substantially the same width; but this is not to be considered as limitative of the present invention. In a second preferred embodiment of the present invention, which is not shown in the drawings because it can easily be conceived of based upon this explanation without particular illustration, the driver's seat 4 is made to be wider than the front passenger's seat 5. Apart from this, this second preferred embodiment is similar to the first preferred embodiment described hereinabove, and the same advantages and benefits arise therefrom, some in greater measure.

Figure 3:
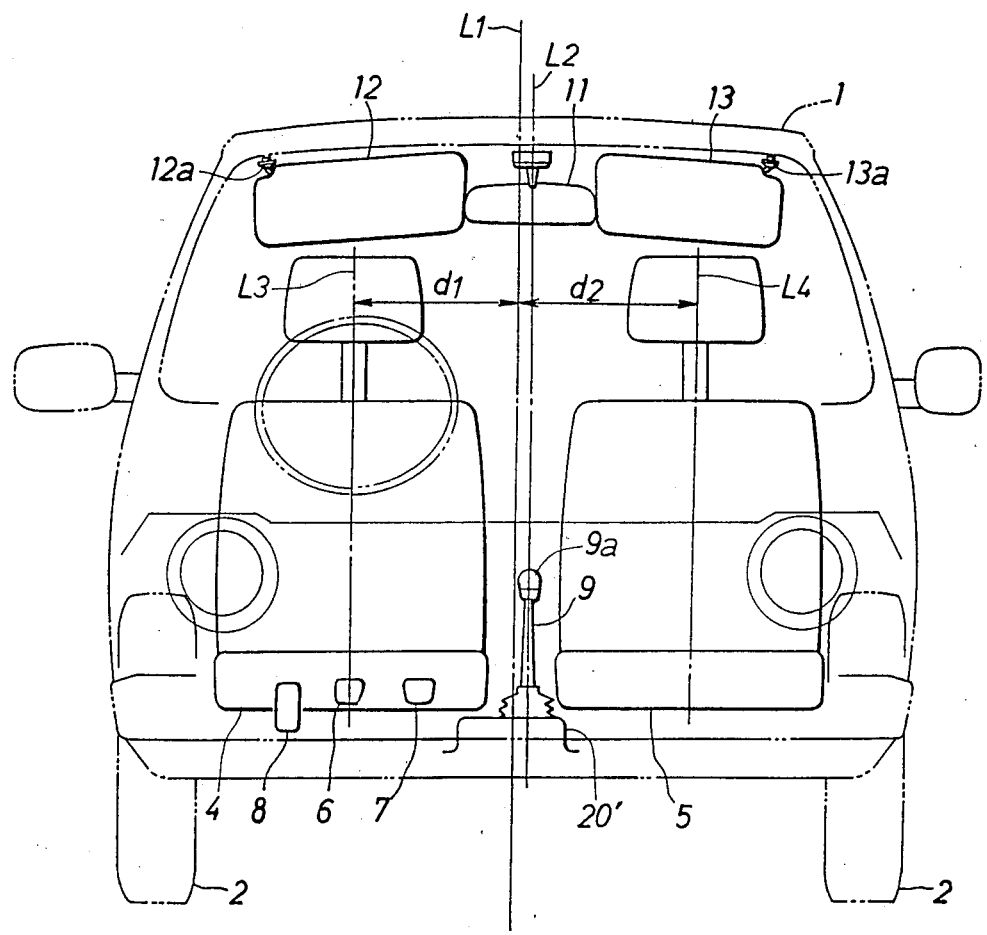
FIG. 3 is a view similar to FIG. 2 showing a third preferred embodiment of the present invention.

Further, as shown as a third preferred embodiment in FIG. 3, the floor tunnel 20' may be provided on the center line L1 of the vehicle while the front seats 4 and 5 are arranged symmetric all with respect to the center line L2 of the two front seats 4 and 5 which is offset toward the passenger's seat 5. In this case, the hand brake lever 10 and the transmission shift lever 9 are accordingly fitted to coincide with the center line L2 of the two front seats 4 and 5, therefore, being substantially offset from the center of the floor tunnel 20'. This embodiment has the advantage of complete symmetry of the vehicle body, in addition to the advantages of the previous embodiments. By having the vehicle body substantially symmetrical, the vehicle body may be readily adapted to manufacture of vehicles of both right and left hand drive configurations.

Although the present invention has been shown and described with reference to the preferred embodiments thereof, it should not be considered as limited thereby. Various possible modifications and alterations could be conceived of by one skilled in the art to any particular embodiment, without departing from the scope of the invention.

What is claimed is:

1. A vehicle body comprising a floor and two sides and defining a longitudinal center line midway between its two sides, comprising:
   (a) a driver's seat fixed to the floor on one side of the body longitudinal center line; and
   (b) a front passenger's seat fixed to the floor on the other side of the longitudinal body center line;
   (c) the approximate center of the driver's seat lying substantially closer to the longitudinal center line of the vehicle body, than does the approximate center of the front passenger's seat.

2. A vehicle body according to claim 1, wherein the longitudinal central line of the driver's seat is substantially parallel to the longitudinal center line of the vehicle body.

3. A vehicle body according to claim 1, wherein the width of the driver's seat is substantially the same as the width of the front passenger's seat.

4. A vehicle body according to claim 1, wherein the width of the driver's seat is substantially greater than the width of the front passenger's seat.

5. A vehicle body according to claim 1, further comprising a central tunnel formed along the floor substantially parallel to the longitudinal center line of the vehicle body, the center line of the central tunnel being coincident with the longitudinal center line of the vehicle body.

6. A vehicle body according to claim 1, further comprising a central tunnel formed along the floor substantially parallel to the longitudinal center line of the vehicle body, the central tunnel being offset towards the front passenger's seat from the longitudinal center line of the vehicle body.

7. A vehicle body according to claim 6, wherein the approximate center of the driver's seat lies at approximately the same distance from the tunnel as does the approximate center of the front passenger's seat.

8. A vehicle body according to claim 1, further comprising a hand brake lever fitted to the floor in a position offset towards the front passenger's seat from the longitudinal center line of the vehicle body.

9. A vehicle body according to claim 8, wherein the approximate center of the driver's seat lies at approximately the same distance from the hand brake lever as does the approximate center of the front passenger's seat.

10. A vehicle body according to claim 5 or 6, further comprising a hand brake lever fitted to the tunnel.

11. A vehicle body according to claim 10, wherein the approximate center of the driver's seat lies at approximately the same distance from the hand brake lever as does the approximate center of the front passenger's seat.

12. A vehicle body according to claim 1, further comprising a transmission shift lever fitted to the floor in a position offset towards the front passenger's seat from the longitudinal center line of the vehicle body.

13. A vehicle body according to claim 12, wherein the approximate center of the driver's seat lies at approximately the same distance from the transmission shift lever as does the approximate center of the front passenger's seat.

14. A vehicle body according to claim 5 or 6, further comprising a transmission shift lever fitted to the tunnel.

15. A vehicle body according to claim 14, wherein the approximate center of the driver's seat lies at approximately the same distance from the transmission shift lever as does the approximate center of the front passenger's seat.

16. A vehicle body according to claim 1, further comprising a driver's side sun visor fitted to a point on the upper portion of the inside of the vehicle body on the side of the longitudinal center line of the vehicle body towards the driver's seat and a front passenger's side sun visor fitted to a point on the upper portion of the inside of the vehicle body on the side of the longitudinal center line of the vehicle body towards the front passenger's seat, wherein the mid point between the inner end of the driver's side sun visor and the inner end of the front passenger's side sun visor is offset towards the front passenger's seat from the longitudinal center line of the vehicle body.

17. A vehicle body according to claim 16, wherein the mid point between the inner end of the driver's side sun visor and the inner end of the front passenger's side sun visor lies substantially equidistant from the approximate center of the driver's seat and the approximate center of the front passenger's seat.

18. A vehicle body according to claim 16 or claim 17, wherein the point of fitting of the driver's side sun visor to the vehicle body and the point of fitting of the front passenger's side sun visor to the vehicle body lie substantially equidistant from the longitudinal center line of the vehicle body.

19. A vehicle body according to claim 18, wherein the driver's side sun visor is substantially longer than the front passenger's side sun visor.

20. A vehicle body according to claim 16 or claim 17, further comprising a rear view mirror fitted at a position in the transverse direction to the vehicle body approximately at the mid point between the inner end of the driver's side sun visor and the inner end of the front passenger's side sun visor.

* * * * *